(12) United States Patent
Tang et al.

(10) Patent No.: US 8,074,234 B2
(45) Date of Patent: Dec. 6, 2011

(54) WEB SERVICE PLATFORM FOR KEYWORD TECHNOLOGIES

(75) Inventors: ZhaoHui Tang, Bellevue, WA (US); Hai Huang, Redmond, WA (US); Rong J. Guan, Sammamish, WA (US); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 879 days.

(21) Appl. No.: 11/787,371

(22) Filed: Apr. 16, 2007

(65) Prior Publication Data

US 2008/0256561 A1    Oct. 16, 2008

(51) Int. Cl.
*G06F 9/50* (2006.01)
(52) U.S. Cl. .................... 719/328; 707/709; 707/710
(58) Field of Classification Search .................... None
See application file for complete search history.

(56) References Cited

U.S. PATENT DOCUMENTS

| | | | |
|---|---|---|---|
| 5,913,215 A | 6/1999 | Rubinstein et al. | |
| 6,169,986 B1 | 1/2001 | Bowman et al. | |
| 6,748,387 B2 | 6/2004 | Garber et al. | |
| 7,092,936 B1 | 8/2006 | Alonso et al. | |
| 2004/0133471 A1 | 7/2004 | Pisaris-Henderson et al. | |
| 2004/0199636 A1* | 10/2004 | Brown et al. | 709/227 |
| 2005/0216446 A1 | 9/2005 | Hall | |
| 2005/0228797 A1 | 10/2005 | Koningstein et al. | |
| 2006/0129531 A1 | 6/2006 | Bates | |
| 2006/0156317 A1* | 7/2006 | McCain et al. | 719/332 |
| 2006/0206475 A1 | 9/2006 | Naam et al. | |
| 2006/0206516 A1 | 9/2006 | Mason | |
| 2006/0242013 A1 | 10/2006 | Agarwal et al. | |
| 2006/0253427 A1 | 11/2006 | Wu et al. | |
| 2007/0016697 A1* | 1/2007 | Roh | 709/250 |
| 2007/0050446 A1* | 3/2007 | Moore | 709/203 |
| 2007/0288431 A1* | 12/2007 | Reitter et al. | 707/3 |

OTHER PUBLICATIONS

"KeyWord Generator lite", http://www.sharewareconnection.com/keyword-generator-lite.htm, Nov. 29, 2005.
Schatz et al., "Interactive term suggestion for users of digital libraries: using subject thesauri and co-occurrence lists for information retrieval", Date: 1996, http://portal.acm.org/citation.cfm?id=226931.226956&dl=portal&dl=ACM&type=series&idx=SERIES492&part=Proceedings&WantType=Proceedings&title=International%20Conference%20on%20Digital%20Libraries&CFID=11111111&CFTOKEN=2222222.
Tseng, Yuen-Hsien , "Multilingual Keyword Extraction for Term Suggestion", Date: 1998, http://portal.acm.org/citation.cfm?id=290941.291066&dl=portal&dl=ACM&type=series&idx=SERIES278&part=Proceedings&WantType=Proceedings&title=Annual%20ACM%20Conference%20on%20Research%20and%20Development%20in%20Information%20Retrieval&CFID=11111111&CFTOKEN=2222222.

* cited by examiner

*Primary Examiner* — S Sough
*Assistant Examiner* — Syed Roni

(57) ABSTRACT

The present web service platform includes a set of application program interfaces (APIs) and a framework for adding services that correspond to the APIs. The web service platform may also support a stored procedure (sproc) that allows combining results from two or more services before transmitting results to an application. The services relate to keyword technologies.

20 Claims, 6 Drawing Sheets

500

```
            508                       506
SELECT MYTABLE.TERM, "PROVIDER".GETSUGGESTEDTERM(5, INCLUDE_STATISTICS)
            504      510
FROM "PROVIDER"  JOIN  MYTABLE
     502            512
ON "PROVIDER".TERM = MYTABLE.KEYWORD
     514
WHERE SIMILARITY()>0.3
     516
ORDER BY SIMILARITY()
     518
```

520

```
SELECT MYTABLE.TERM, "PROVIDER".GETSUGGESTEDTERM(2)
                                      524
FROM MYTABLE T  JOIN  ATOM A JOIN STS S
                   522

ON T.TERM = A.TERM

AND T.TERM = S.TERM
```

*Fig. 5*

WEB SERVICE PLATFORM FOR KEYWORD TECHNOLOGIES

BACKGROUND

Web services that allow an application to communicate with other applications over a network are becoming increasingly popular. A new trend for web-based applications is called a "mash-up". Mash-ups utilize two or more different web services from disparate, and possibly competing, web sites. This ability to obtain and combine data from multiple sources allows unlimited opportunities for programming new types of web-based applications.

SUMMARY

Described herein are various technologies that support a web service platform for keyword technologies. The web service platform includes a set of keyword service application programming interfaces (APIs) and a framework for adding services that implement the keyword service APIs. The web service platform may also support a stored procedure (sproc) that allows combining results from two or more services before transmitting the results to an application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Many of the attendant advantages of the present keyword platform will become more readily appreciated as the same becomes better understood with reference to the following detailed description. A brief description of each drawing is described below.

FIG. 5 illustrates example queries for interacting with keyword services via an application.

DETAILED DESCRIPTION

Before describing the present keyword platform, the description defines a few terms to aid in understanding the following discussion. The term web service refers to code that performs business logic through a programmatic interface over a network. The term application refers to code that interacts with one or more web services to obtain results from the one or more web services. A keyword platform refers to a web service platform that implements keyword technologies. Keyword technologies include keyword suggestion, keyword forecast, keyword relevance, keyword taxonomy, and other services that obtain information useful to advertisers. A keyword server refers to a server on a network configured with the keyword platform.

As will be explained in more detail below, the present keyword platform allows service providers the ability to easily add and update new web services and allows web developers the ability to incorporate the new services into new and/or existing applications in a timely manner. The following discussion first describes an operating environment that implements a keyword platform. Next, the discussion focuses on components of the keyword platform. The discussion then describes an example data structure suitable for specifying keyword service APIs provided by the keyword platform and describes several example keyword service APIs. Next, the discussion describes example queries that allow an application to interact with keyword services via an application. Lastly, the discussion describes one embodiment for a keyword server.

However, before describing the above items, it is important to note that various embodiments are described fully below with reference to the accompanying drawings, which form a part hereof, and which show specific implementations for practicing various embodiments. However, other embodiments may be implemented in many different forms and should not be construed as limited to the embodiments set forth herein; rather, these embodiments are provided so that this disclosure will be thorough and complete. The following detailed description is, therefore, not to be taken in a limiting sense.

Figure 1:
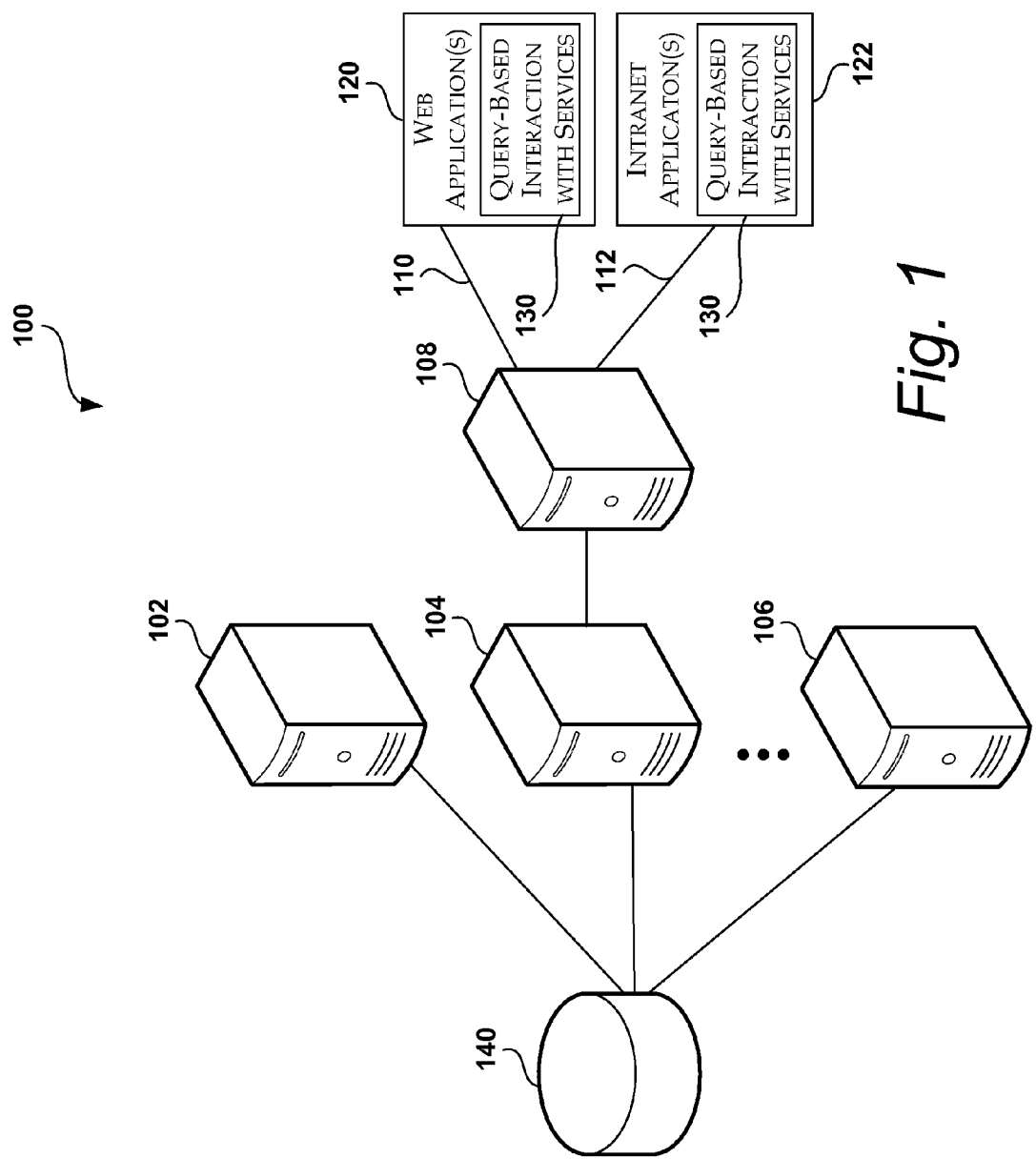
FIG. 1 is a graphical illustration of one example operating environment into which a keyword platform may be incorporated.

In various embodiments, the logical operations may be implemented (1) as a sequence of computer implemented steps running on a computing device and/or (2) as interconnected machine modules (i.e., components) within the computing device. The implementation is a matter of choice dependent on the performance requirements of the computing device implementing the embodiment. Accordingly, the logical operations making up the embodiments described herein are referred to alternatively as operations, steps, or modules.
Operating Environment for a Keyword Platform FIG. 1 is a graphical illustration of an example operating environment 100 into which the present keyword platform may be utilized. In this example, a cluster of servers (i.e., servers 102, 104, and 106) communicate with a keyword server 108. In this operating environment 100, the keyword server 108 is configured as a front-end server to a well-known server cluster architecture. Web applications 120 and intranet applications 122 communicate with the well-known server cluster architecture via the keyword server 108 instead of directly with servers 102, 104, and 106.

The keyword server 108 includes a keyword platform (not shown) that provides a mechanism for supporting applications that request services available via the keyword server. In addition, keyword server 108 is configured to enforce an interface contract for the keyword services available via the keyword server. Each keyword service is associated with a respective interface contract (i.e., API). One application (e.g., web application 120) may obtain data from multiple keyword services via the interface.

The web applications and intranet applications may perform any type of functionality, such as paid searches, content advertisements, and/or other functionality desirable to a specific industry. Web applications may communicate with the keyword server 108 using various known protocols over a network (e.g., network 110 and 112). One common protocol is hypertext transfer protocol (http), which may be used for interacting with the keyword server 108 when the keyword server 108 and the web application 120 are not on the same corporate network. Another common protocol, transmission control protocol (tcp), may be used for interacting with the keyword server 108 when keyword server 108 and the intranet application 122 are both within the same corporate network. However, other protocols may be utilized in conjunction with the present keyword platform without departing from the claimed invention.

The web applications 120 and intranet applications 122 (hereinafter jointly referred to as applications) may utilize a query-based interaction 130 with the keyword services provided by the keyword server. The query-based interaction may be implemented using structured query language (SQL) concepts. FIG. 5, described below, illustrates some example query interactions.

In addition, operating environment 100 may include a data mart 140. Data mart 140 maintains updated data gathered from web servers 102-106. Conventional techniques may be used to update information in data mart 140.

An Example of a Keyword Platform

Figure 2:
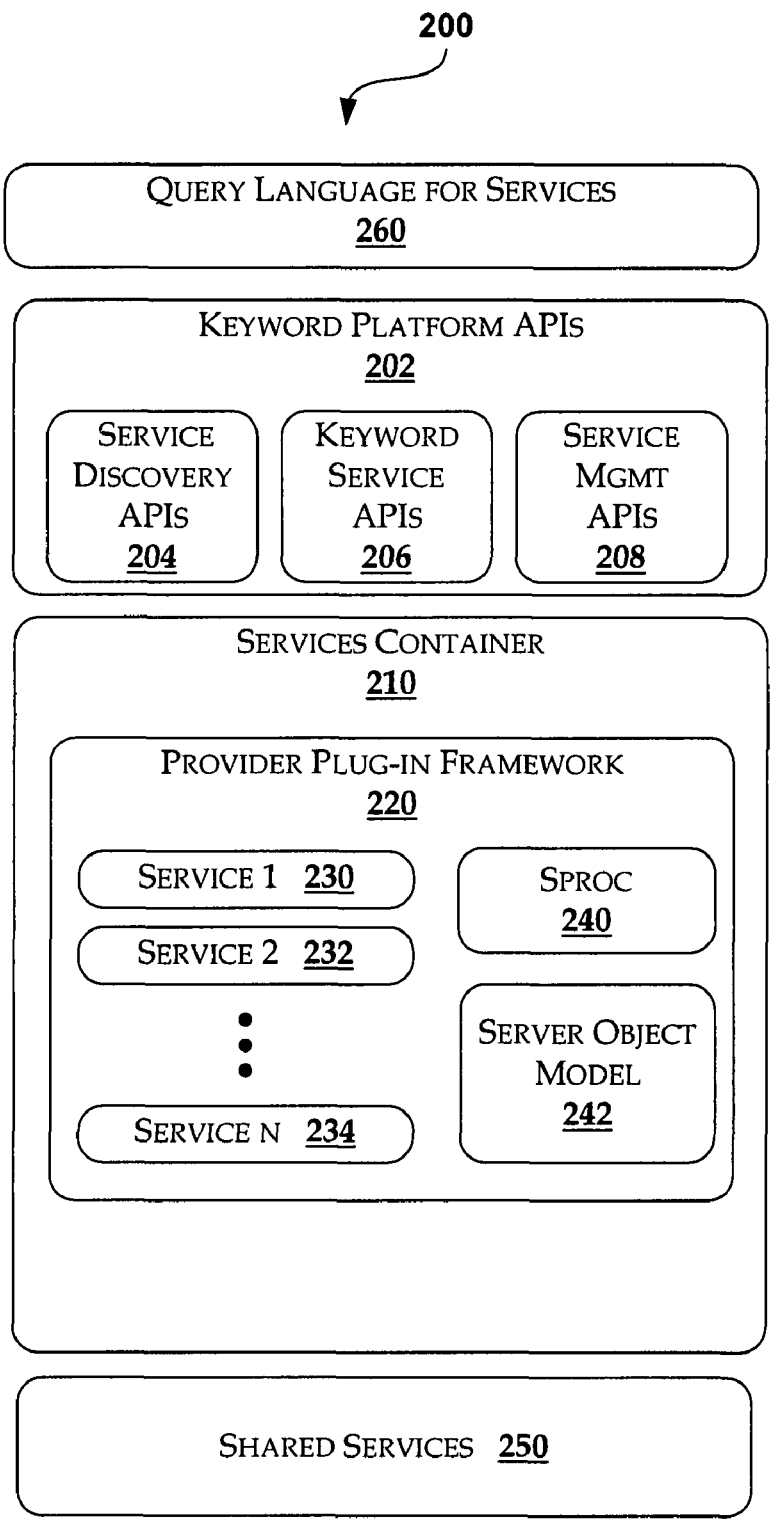
FIG. 2 illustrates one example configuration of keyword components suitable for implementing the keyword platform.

FIG. 2 illustrates one example keyword platform 200 that has several components. All or a portion of the components may be implemented on a keyword server, such as keyword server 108 shown in FIG. 1. The following discussion describes a keyword platform that implements keyword technologies, such as keyword suggestion, keyword forecast, keyword relevance, keyword taxonomy, and other services related to advertising. However, the platform may be modified to support services related to other technologies and/or industries. The following discussion describes the keyword platform 200 by describing several components of the keyword platform. One will appreciate that it is not necessary for the keyword server to implement all of the components illustrated in the example keyword platform 200. The keyword server may also implement additional components and/or may modify the arrangement of components to provide similar functionality.

The keyword platform 200 includes keyword platform APIs 202 and a provider plug-in framework 220. The keyword platform APIs 202 includes service discovery APIs 204 and keyword service APIs 206. The service discovery APIs 204 allows developers to query a keyword server to identify the services supported by the keyword server. FIG. 5, described below, illustrates example queries for discovering services.

Figure 3:
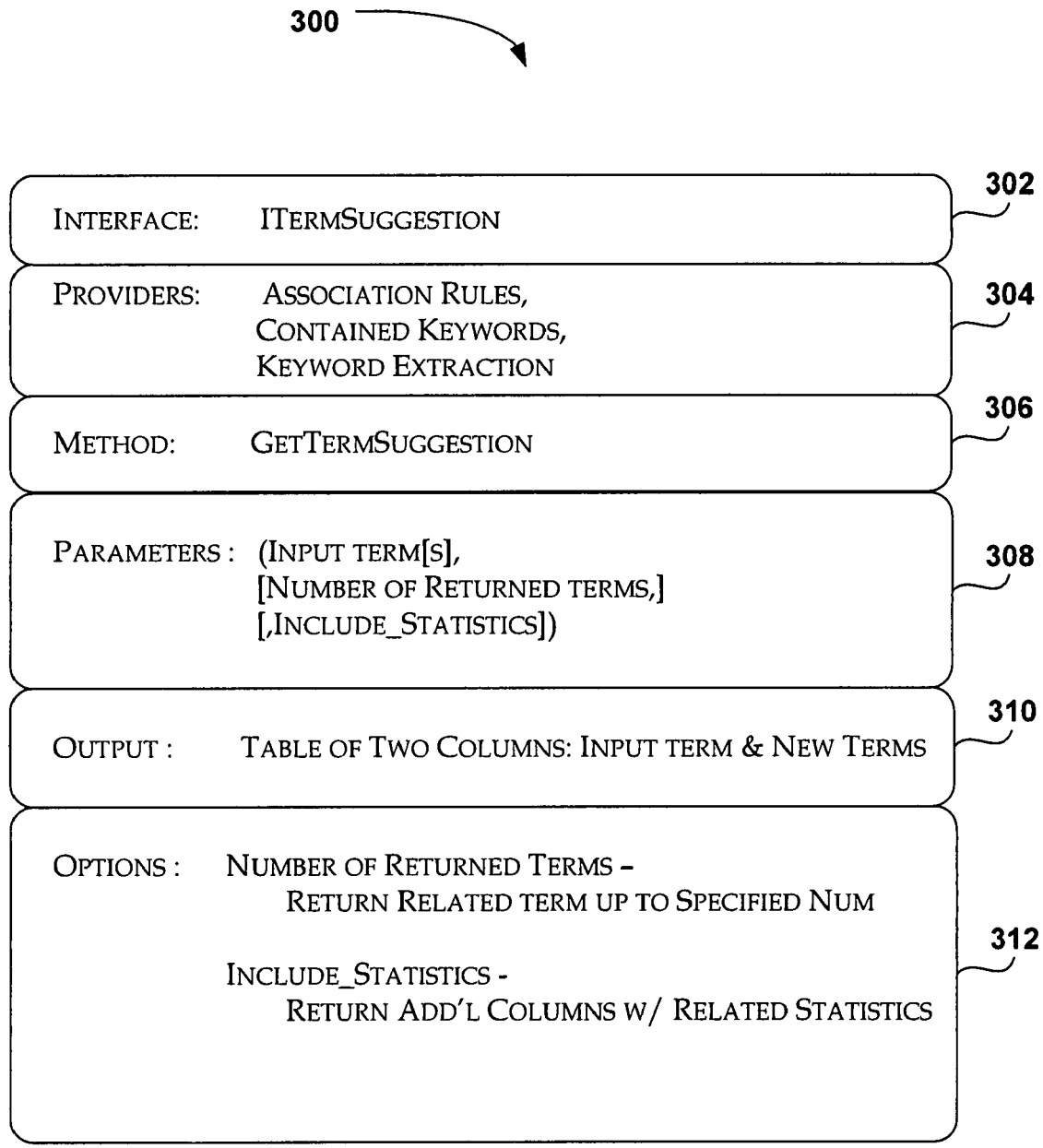
FIG. 3 illustrates an example data structure for specifying keyword service APIs.

The keyword service APIs 206 includes a set of application program interfaces (APIs) that define a contract between service providers and application developers. Keyword service APIs 206 allow application developers to program an application using the set of keyword service APIs without being tied to any specific service provider. The providers may be within a company's intranet and/or may be from web sites on the World Wide Web (i.e., the web). By utilizing the present keyword platform, service providers can quickly release their services to application developers for use. The service providers implement keyword services in conformity with the set of keyword service APIs. The applications can then automatically understand the newly released keyword services and make use of the newly released keyword services in a new or existing application. FIG. 3, described below, illustrates an example data structure for defining keyword service APIs 206.

The keyword platform APIs 202 may also include one or more service management APIs 208. Service management APIs 208 allow system administrators the ability to add and/or remove services (e.g., services 230-234), re-distribute services to other computing devices, and perform other actions that help maintain the keyword platform.

The provider plug-in framework 220 provides a mechanism for adding one or more keyword services (e.g., services 230-234) from one or more providers. Each keyword service implements one of the interfaces defined by the keyword service APIs. In one embodiment, provider plug-in framework 220 may be implemented within a service container 210. The service container 210 hosts algorithms and execution models related to the services. Developers can add services that implement the plug-in interface to the keyword platform.

The provider plug-in framework 220 may also include a stored procedure component 240. The stored procedure component 240 allows combining results from two or more keyword services to create a combined result before transmitting results to an application. The stored procedure component 240 maintains one or more stored procedures that are accessible to a keyword server. The stored procedures may be stored locally on the keyword server or on another computing device accessible to the keyword server. Because the keyword platform supports stored procedures, applications may utilize stored procedures to minimize the amount of data that is transmitted over a network and to minimize the amount of business logic coded in the application. A stored procedure call interface is provided by the keyword platform to allow applications access to the stored procedures.

The provider plug-in framework 220 may also include a server object model 242. The server object model 242 supports an object-based programming language that an application may use to have one keyword service call another keyword service. The call may then be stored within a stored procedure that is available to the keyword server. The server object model may support any type of object-based programming language.

The keyword platform 200 may further include a query language for services 260. The query language 260 allows developers to query a keyword server for services. The query language may be based on a structured query language (SQL) and may be based on relational database concepts. In one embodiment, keyword services may be modeled as relational tables that can be queried. The query may then be structured to include standard query clauses, such as SELECT, FROM, and/or WHERE clauses. The query language 260 may allow results of multiple keyword services to be joined together sequentially, provided as a union of results, or the like. In another variation, the query language may allow an input keyword to be constructed on the fly. FIG. 5, described below, illustrates some example queries.

The keyword platform 200 may also include shared services 250. In general, shared services represent common tools that any of the keyword services 230-234 may call. One or more of the shared services 250 may be combined with one or more keyword services into a sproc 240.

As one skilled in the art will appreciate, the functionality provided by the components of the keyword platform 200 may be rearranged in a different manner without departing from the present keyword platform. Thus, FIG. 2 illustrates one possible arrangement of the components suitable for implementing a keyword platform.

Example Data Structures and Keyword Service APIs

Figure 4:
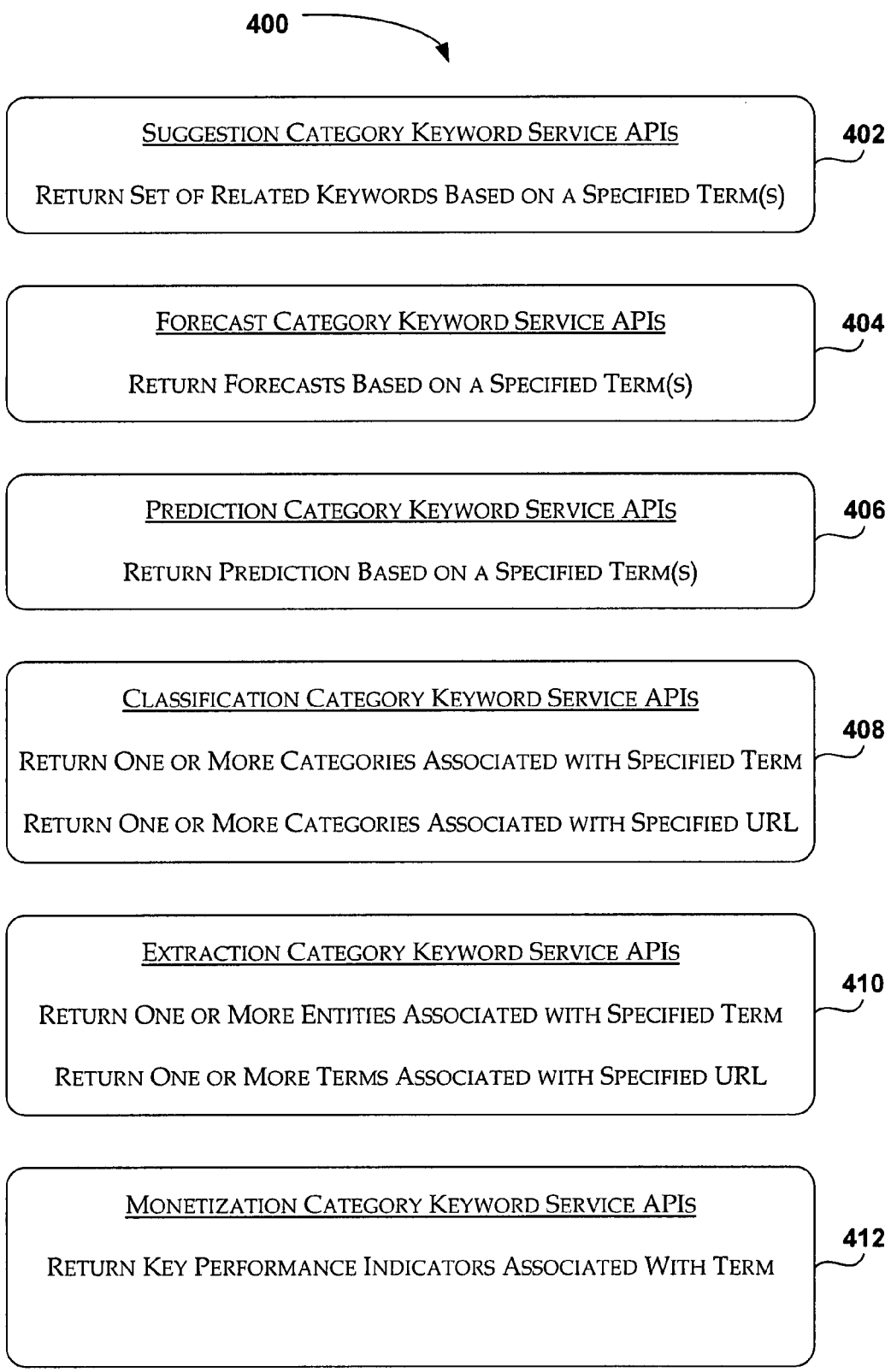
FIG. 4 illustrates several example categories of keyword service APIs.

FIGS. 3 and 4 illustrate an example data structure for defining service APIs related to keyword technologies and example keyword service APIs, respectively. One will note that the keyword platform may incorporate numerous other keyword service APIs without departing from the present keyword platform.

FIG. 3 illustrates an example data structure 300 for keyword service APIs. Data structure 300 includes an interface 302, a set of providers 304, a method 306, parameters 308, and output 310. The interface 302 identifies a name that is associated with a contract (i.e., an interface) between service providers and application developers. One or more service providers may implement interface 302. Each service provider is identified in the set of providers 304. The providers identified in the set of providers 304 correspond to the services 230-234 identified in FIG. 2. Each provider implements a method 306 identified by a method name (e.g., GetTermSuggestion). The parameters 308 identify input parameters for method 306. The input parameters may be a single term or may be several terms. In one embodiment, if the input parameters are several terms, the several terms may be provided via a table. Output 310 specifies the manner in which results from the execution of method 306 are provided to a caller (e.g., another service or application). Data structure 300 may optionally have one or more options 312 that further specify the manner in which results are provided to the caller. For example, one option may specify a number for how many related terms are returned. Another option may specify how to return statistics related to the term. One interface may have multiple methods 306 with each method having corresponding parameters 308 and output 310.

FIG. 4 illustrates several example categories for keyword service APIs related to keyword technologies. One example category may be a suggestion category 402 that may return a set of related keywords based on specified term(s). The ITermSuggestion shown in FIG. 3 is one example interface in this category. The ITermSuggestion interface may be implemented by various methods, such as GetTermSuggestion. The following is a sample GetTermSuggestion call from the suggestion category 402, along with corresponding output.

| GetTermSuggestion(book,3,INCLUDE_STATISTICS) | | | |
|---|---|---|---|
| Input Term | Suggest Term | Similarity | Frequency |
| Book | Library | 0.59 | 200 |
| Book | Author | 0.54 | 1200 |
| Book | Bookstores | 0.48 | 123 |

Another category of keyword service APIs may be a forecast category 404. The forecast category 404 may return forecasts based on a specified term(s). An example interface may be ITermForecast. The ITermForecast may be implemented by various methods, such as GetTermForecast. GetTermForecast may return forecasts as a table of one row regarding traffic forecasts for a given term where the forecast for each month is listed in a column. Parameters may include a term and an optional starting month and/or ending month. The input parameter may be a single term or multiple terms. In one embodiment, if multiple terms are supplied, the output may be a table of multiple rows. If the INCLUDE_STATISTICS option is specified when calling the GetTermForecast method, the GetTermForecast method may return statistical information, such as standard deviation and/or mean. An example utilization of the GetTermForecast method may be for updating an application regularly with information obtained from a data mart shown in FIG. 1. The following is a sample GetTermForecast call from the forecast category 404, along with corresponding output.

| GetTermForecast (book,−2,1) | | | | |
|---|---|---|---|---|
| Term | M − 2 | M − 1 | M | M + 1 |
| Book | 120 | 130 | 140 | 160 |

Another category of keyword service APIs may be a prediction category 406. The prediction category 406 may return prediction(s) based on specified term(s). An example interface in the prediction category 406 may be a IDemographicPrediction interface. IDemographicPrediction interface may predict the demographics (e.g., age, gender) for given keyword(s). Providers of the IDemographicPrediction interface may include methods based on demographic prediction models. The IDemographicPrediction interface may have several methods, such as GetTermPredictedGender, GetTermPredictedAge, GetTermPredictedDemographic, and other prediction methods. The following are some sample method calls from the prediction category 406, along with corresponding output.

| GetTermGender('Book','Business') | | | |
|---|---|---|---|
| Term | Male Probability | Female Probability | Unknown Probability |
| Book | 0.60 | 0.30 | 0.10 |
| Business | 0.75 | 0.21 | 0.04 |

| GetTermPredictedAge('Book','Business') | | | |
|---|---|---|---|
| Term | Age 0–15 Probability | Age 15–25 Probability | Unknown Probability |
| Book | 0.10 | 0.30 | 0.10 |
| Business | 0.15 | 0.21 | 0.04 |

Another category of keyword service APIs may be a classification category 408. The classification category 408 may return one or more categories associated with a specified term(s) or a specified uniform resource locator(s) (URL). An example interface in the classification category 408 may be ITermCategorization interface. ITermCategorization interface may return likely categories for a given keyword(s). The ITermCategorization interface may have several methods, such as GetTermCategories. One example method call for the ITermCategorization interface may be as follows:

GetTermCategories("credit card").

Another example interface in the classification category 408 may be IUrlCategorization interface. IUrlCategorization interface may return likely categories for a given URL. The IUrlCategorization interface may have several methods, such as GetUrlCategories. One example method call for the IUrlCategorization interface may be as follows:

GetUrlCategories(http://someautos.com/).

Another category of keyword service APIs may be an extraction category 410. The extraction category 410 may return one or more entities associated with specified term(s) or specified uniform resource locator(s) (URL). An example interface in the extraction category 410 may be IEntityExtraction interface. IEntityExtraction interface may return entities associated with given term(s). The IEntityExtraction interface may be implemented using various methods, such as GetEntities. One example method call for the IEntityExtraction interface may be as follows:

GetEntities("low price car rental").

The example method call may return entities having low prices for car rentals. Another example interface in the extraction category 410 may be ITermExtraction interface. ITermExtraction interface may return one or more terms associated with a specified URL. The ITermExtraction interface may be implemented using various methods, such as GetTermsFromUrl. One example method call for the ITermExtraction interface may be as follows:

GetTermsFromUrl(http://someautos.com/).

Another category of keyword service APIs may be a monetization category 412. The monetization category may be based on common monetization factors, such as vertical (output) monetization, horizontal (processes) monetization, and/or key performance indicators (KPIs). An example interface in the monetization category 412 may be ITermMonetization interface. The ITermMonetization interface may be implemented using various methods, such as GetTermKPIs. One example method call for the ITermMonetization interface may be as follows:

GetTermKPIs("digital camera").

This example call would return the key performance indicators associated with digital cameras. Another example interface in the monetization category 412 may be IVerticalMonetization interface. Again, the IVerticalMonetization interface may be implemented using various methods, such as GetVerticalKPIs. One example method call for the IVerticalMonetization interface may be as follows:

GetVerticalKPIs("Travel/Host", TimeInterval.LastWeek).

This example call may return indicators related to a keyword (e.g., "Travel/Host"). The indicators may include a number of clicks, a number of impressions, an average position of the keyword in specified areas (e.g., sidebar and/or mainline) of the web pages, a total cost for all customers with the keyword, a click through rate (CTR) that specifies a percentage of user clicks on a specific ad when the ad is displayed, a cost per click (CPC), and other key performance indicators. One skilled in the art of online advertising will appreciate that different methods may include other key performance indicators along with the ones mentioned above and/or may omit one or more of the ones discussed above. As one skilled in the art will appreciate, service providers may implement the interfaces in various ways via their provided methods. As long as the service provider implements the interface as specified, applications may choose which provider to use without modifying the application. For example, if a web developer chooses a default provider in the application, when the default provider is modified, the application is automatically upgraded to use the new default provider. This allows web developers the convenience of "adding" new services with little impact to their application.

FIG. 5 illustrates example queries for interacting with services via an application. For these example queries, each service is modeled as a relational table that can be queried. The query language may support SELECT, FROM, and WHERE clauses and may allow various services (i.e., providers) to be joined together either sequentially or as a union of results. In addition, the query language may support a singleton query, which means the input keyword is constructed on the fly instead of provided within a table.

FIG. 5 illustrates example queries 500 and 520. Example query 500 includes a FROM clause 502 that identifies a provider 504 for implementing method 506 identified in the SELECT clause 508. A table 510 (e.g., MyTable) may be joined using a JOIN clause 512. Data from the table may be conditionally selected using the WHERE clause 516. An ORDER BY clause 518 may order the results by row based on one of the column headings, such as "similarity" when the INCLUDE_STATISTICS option is specified.

In example query 520, two providers ATOM 522 and STS 524 are joined using a JOIN clause. The term from myTable is used for both providers when the providers execute. Query 520 illustrates a sequential joining of results. Query 520 may be modified by replacing the FROM clause with "FROM myTable t, Association a, STS s" to achieve a simple union of the results from the two providers 522 and 524.

Even though FIG. 5 illustrates example queries using SELECT, FROM, WHERE, JOIN, and ORDER BY clauses, those skilled in the art will appreciate that other structured query language syntax may be implemented by the query language to interact with keyword services. Thus, FIG. 5 illustrates a few example queries for interacting with keyword services via an application using a query-based language.

One Embodiment for a Keyword Server

Figure 6:
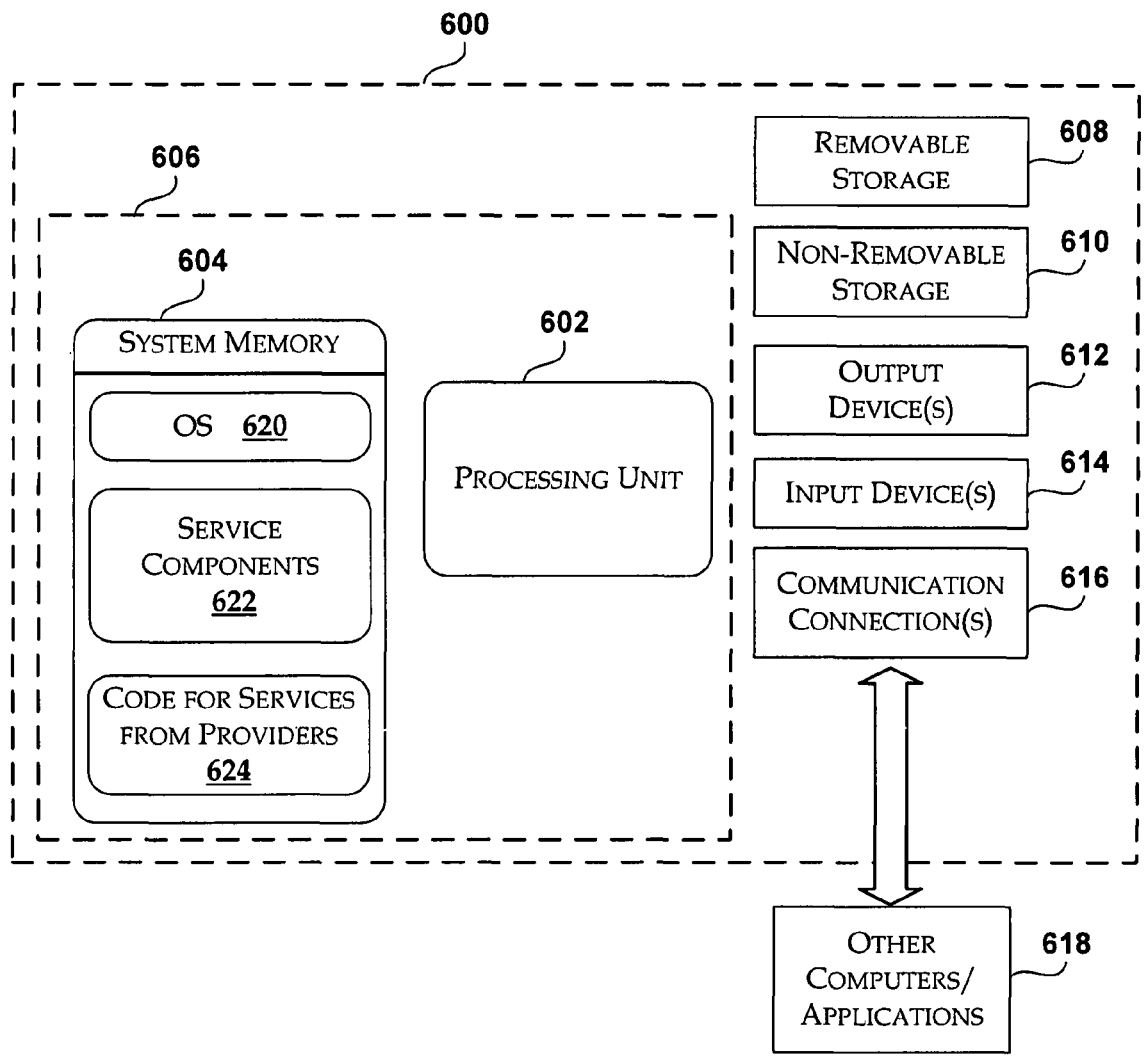
FIG. 6 is a functional block diagram of a keyword server implementing one or more of the components of the keyword platform shown in FIG. 2.

FIG. 6 is a functional block diagram of a computing device that may implement one or more of the components of the keyword platform 200 shown in FIG. 2. The following describes one possible configuration for the computing device 600. The computing device includes at least a processing unit 602 and memory 604. Depending on the exact configuration and type of computing device, memory 604 may be volatile (such as RAM), non-volatile (such as ROM, flash memory, etc.) or some combination of the two. System memory 604 typically includes an operating system 620, one or more applications, and may include program data. For the present keyword platform, memory may include code 624 for services from various providers. However, one skilled in the art will recognize that code 624 may also be on another computer, such as web server 102 illustrated in FIG. 1. Memory 604 also includes one or more of the components 622 of the keyword platform. This basic configuration is illustrated in FIG. 6 by dashed line 606.

Additionally, computing device 600 may also have other features and functionality. For example, computing device 600 may also include additional storage (removable and/or non-removable) including, but not limited to, magnetic or optical disks or tape. Such additional storage is illustrated in FIG. 6 by removable storage 608 and non-removable storage 610. Computer-readable storage media includes volatile and nonvolatile, removable and non-removable media implemented in any method or technology for storage of information such as computer readable instructions, data structures, program modules or other data. Memory 604, removable storage 608, and non-removable storage 610 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also include one or more communication connections 616 that allow the computing device 600 to communicate with one or more computers and/or applications 618. Device 600 may also have input device(s) 612 such as keyboard, mouse, pen, voice input device, touch input device, etc. Output device(s) 612 such as a speaker, printer, monitor, and other types of digital display devices may also be included. These devices are well known in the art and need not be discussed at length here.

The processes described above may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
   a processing unit; and
   a memory into which a plurality of instructions are loaded, the plurality of instructions comprising:
   a keyword service application programming interface (API) configured to define a method interface comprising a method name and identifying input parameters;
   a query language component configured to receive queries for a plurality of keyword services using a query language associated with the query language component;
   a provider plug-in framework that is configured to add:
   a first new keyword service that implements the method interface with a first method that is associated with the first new keyword service and is called with the method name and the input parameters; and
   a second new keyword service that implements the method interface with a second method that is associated with the second new keyword service, is different than the first method, and is also called with the method name and the input parameters,
   wherein the queries received by the query language component include an identifier of the method interface and the input parameters identified by the method interface.

2. The device recited in claim 1, wherein the keyword service API specifies one or more outputs for the method interface.

3. The device recited in claim 1, wherein the provider plug-in framework is implemented via a container class.

4. The device recited in claim 1, wherein the provider plug-in framework is further configured to maintain the plurality of keyword services, including at least a third keyword service that implements a second keyword service API.

5. The device recited in claim 4, wherein the plurality of instructions further comprise a stored procedure component configured to store a procedure that combines results from at least two of the plurality of keyword services.

6. The device recited in claim 5, further comprising a server object model configured to support execution of the stored procedure.

7. The device recited in claim 1, wherein the keyword service API is related to a keyword technology that comprises forecasting, and at least one of the plurality of keyword services returns a forecast based on a specified term.

8. The device recited in claim 1, wherein the keyword service API is related to a keyword technology that comprises classification of keywords and at least one of the plurality of keyword services returns at least one category associated with a specified term.

9. The device recited in claim 1, wherein the keyword service API is related to a keyword technology that comprises classification and at least one of the plurality of keyword services returns at least one category associated with a specified uniform resource locator (URL).

10. The device recited in claim 1, wherein the keyword service API is related to a keyword technology that comprises extraction and at least one of the plurality of keyword services returns at least one entity associated with a specified term.

11. The device recited in claim 1, wherein the keyword service API is related to a keyword technology that comprises a keyword suggestion and at least one of the plurality of keyword services returns a set of related keywords based on a specified term.

12. A method comprising:
   storing a keyword service application programming interface (API) that defines a method interface comprising a method name and identifying input parameters;
   receiving a query including the method name and the input parameters identified by the method interface;
   querying a first keyword service that implements the method interface with a first method that is associated with the first keyword service;
   querying a second keyword service that implements the method interface with a second method that is associated with the second keyword service and is different than the first method;
   receiving first query results from the first keyword service;
   receiving second query results from the second keyword service;
   combining the first query results and the second query results to create combined results; and
   providing the combined results in response to the received query,
   wherein both the first method and the second method are called with the method name and the input parameters identified by the method interface that is defined by the keyword service API.

13. The method according to claim 12, wherein the first query results comprise related terms.

14. The method according to claim 13, wherein the keyword service API includes an option that specifies how many related terms are included in the first query results.

15. The method according to claim 12, wherein the keyword service API also defines a second method interface comprising a second method name and second input parameters.

16. One or more computer-readable storage media storing instructions which, when executed by one or more processing units, cause the one or more processing units to perform:
   storing a keyword service application programming interface (API) that defines a method interface comprising a method name and identifying input parameters;
   receiving a query including the method name and the input parameters identified by the method interface;
   querying a first keyword service that implements the method interface with a first method that is associated with the first keyword service;
   querying a second keyword service that implements the method interface with a second method that is associated with the second keyword service and is different than the first method;

receiving first query results from the first keyword service;

receiving second query results from the second keyword service;

combining the first query results and the second query results to create combined results; and providing the combined results in response to the received query, wherein both the first method and the second method are called with the method name and the input parameters identified by the method interface that is defined by the keyword service API.

17. The computer-readable storage media according to claim 16, wherein the first query results and the second query results are combined using a stored procedure.

18. The computer-readable storage media according to claim 16, wherein the first query results and the second query results are combined using a join operation.

19. The computer-readable storage media according to claim 18, wherein the received query identifies the first keyword service, the second keyword service, and the join operation.

20. The computer-readable storage media according to claim 16, wherein the received query identifies an ordering for the first query results.

* * * * *

UNITED STATES PATENT AND TRADEMARK OFFICE
CERTIFICATE OF CORRECTION

| | |
|---|---|
| PATENT NO. | : 8,074,234 B2 |
| APPLICATION NO. | : 11/787371 |
| DATED | : December 6, 2011 |
| INVENTOR(S) | : ZhaoHui Tang et al. |

Page 1 of 1

It is certified that error appears in the above-identified patent and that said Letters Patent is hereby corrected as shown below:

In column 11, line 10, in Claim 16, after "interface" delete "that is".

Signed and Sealed this
Thirty-first Day of January, 2012

David J. Kappos
*Director of the United States Patent and Trademark Office*